United States Patent [19]
Vaahs et al.

[11] Patent Number: 5,196,556
[45] Date of Patent: * Mar. 23, 1993

[54] POLYSUBSTITUTED CHLORINE-CONTAINING SILAZANE POLYMERS, PROCESS FOR THEIR PREPARATION, CERAMIC MATERIALS CONTAINING SILICON NITRIDE WHICH CAN BE MANUFACTURED THEREFROM, AND THEIR MANUFACTURE

[75] Inventors: Tilo Vaahs, Kelkheim; Marcellus Peuckert; Martin Brück, both of Hofheim am Taunus, all of Fed. Rep. of Germany

[73] Assignee: Hoechst Aktiengesellschaft, Frankfurt am Main, Fed. Rep. of Germany

[*] Notice: The portion of the term of this patent subsequent to Jan. 26, 2010 has been disclaimed.

[21] Appl. No.: 444,012

[22] Filed: Nov. 30, 1989

[30] Foreign Application Priority Data

Dec. 3, 1988 [DE] Fed. Rep. of Germany ....... 3840779

[51] Int. Cl.$^5$ ................................................. C07F 7/10
[52] U.S. Cl. ..................................... 556/409; 556/412; 528/33; 528/34; 528/37; 528/38
[58] Field of Search ................... 556/409, 412; 528/33, 528/34, 37, 38

[56] References Cited

U.S. PATENT DOCUMENTS

| | | | |
|---|---|---|---|
| 3,355,475 | 11/1967 | Baney | 556/409 |
| 4,397,828 | 8/1983 | Seyferth et al. | 423/344 |
| 4,482,669 | 11/1984 | Seyferth et al. | 524/442 |
| 4,540,803 | 9/1985 | Cannady | 556/412 |
| 4,543,344 | 9/1985 | Cannady | 501/92 |
| 4,595,775 | 6/1986 | Arkles | 556/409 |
| 4,659,850 | 4/1987 | Arai et al. | 556/409 |
| 4,720,532 | 1/1988 | Seyferth et al. | 528/28 |
| 4,771,118 | 9/1988 | Takamizawa et al. | 528/14 |
| 4,869,854 | 9/1989 | Takeda et al. | 264/22 |
| 4,870,035 | 9/1989 | Takamizawa et al. | 501/88 |
| 4,952,715 | 8/1990 | Blum et al. | 556/409 |

FOREIGN PATENT DOCUMENTS

| | | |
|---|---|---|
| B586050 | 6/1987 | Australia. |
| 1086250 | 10/1967 | United Kingdom. |
| 1086520 | 10/1967 | United Kingdom. |

OTHER PUBLICATIONS

Wills, R. R. et al., *Ceramic Bulletin* 62:904–915 (1983).

*Primary Examiner*—Paul F. Shaver

[57] ABSTRACT

The invention relates to novel polysubstituted chlorine-containing silazane polymers, to their preparation, to their processing to form ceramic material containing silicon nitride, and to said material itself. The chlorine-containing silazane polymers are prepared by reating oligosilazanes of formula (I)

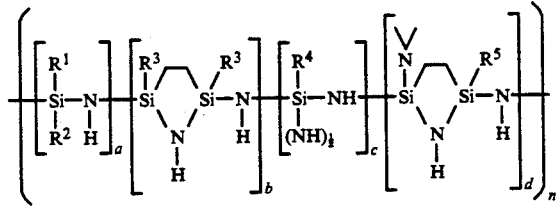

in which at least one of the indices a or b and at least one of the indices c or d are not equal to 0 and n is about 2 to about 12, with at least one of the chlorosilanes $Cl_2R^6Si—CH_2CH_2—SiR^6Cl_2$, $Cl_3Si—CH_2CH_2—SiR^7Cl_2$, $R^8SiCl_3$ or $R^9SiHCl_2$ at 30° C. to 300° C., where the radicals independently of one another have the following meanings: $R^1$, $R^2$, $R^4$=H, $C_1$-$C_6$ alkyl or $C_2$-$C_6$ alkenyl and $R^3$, $R^5$, $R^6$, $R^7$, $R^8$, $R^9$=$C_1$-$C_6$ alkyl or $C_2$-$C_6$ alkenyl.

The polysubstituted chlorine-containing silazane polymers according to the invention can be converted into polysilazanes by reaction with ammonia, and these in turn can be pyrolyzed to form ceramic materials containing silicon nitride.

5 Claims, No Drawings

POLYSUBSTITUTED CHLORINE-CONTAINING SILAZANE POLYMERS, PROCESS FOR THEIR PREPARATION, CERAMIC MATERIALS CONTAINING SILICON NITRIDE WHICH CAN BE MANUFACTURED THEREFROM, AND THEIR MANUFACTURE

The invention relates to novel polysubstituted chlorine-containing silazane polymers, to their preparation, to their processing to form ceramic material containing silicon nitride, and to said material itself.

The pyrolysis of polysilazanes to form ceramic material containing silicon nitride has already been described in the literature (R. R. Wills et al., Ceramic Bulletin, vol. 62 (1983), 904–915).

Polysilazanes are normally prepared using chlorosilanes as starting materials, which are reacted with ammonia or primary or secondary amines (U.S. Pat. Nos. 4 540 803, 4 543 344, 4 595 775, 4 397 828, 4 482 669).

The present invention provides novel starting materials for polysilazanes, i.e. polysubstituted chlorine-containing silazane polymers.

The present invention relates to a process for the preparation of polysubstituted chlorine-containing silazane polymers which comprises reacting oligosilazanes of formula (I)

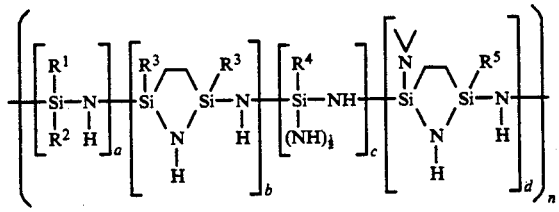

in which at least one of the indices a or b and at least one of the indices c or d are not equal to 0 and n is about 2 to about 12, with at least one of the chlorosilanes $Cl_2R^6Si—CH_2CH_2—SiR^6Cl_2$, $Cl_3Si—CH_2CH_2—SiR^7Cl_2$, $R^8SiCl_3$ or $R^9SiHCl_2$ at 30° C. to 300° C., where the radicals independently of one another have the following meanings: $R^1$, $R^2$, $R^4$=H, $C_1$–$C_6$ alkyl or $C_2$–$C_6$ alkenyl and $R^3$, $R^5$, $R^6$, $R^7$, $R^8$, $R^9$=$C_1$–$C_6$ alkyl or $C_2$–$C_6$ alkenyl.

Preferably, the radicals independently of one another have the following meanings: $R^1$, $R^2$, $R^4$=H, $C_1$–$C_3$ alkyl or $C_2$–$C_3$ alkenyl and $R^3$, $R^5$, $R^6$, $R^7$, $R^8$, $R^9$=$C_1$–$C_3$ alkyl or $C_2$–$C_3$ alkenyl. It is especially preferred if $R^1$=H, $R^2$=$R^3$=$R^5$=$R^6$=$R^7$=$R^9$=$CH_3$ and $R^4$ and $R^8$ independently of one another are $CH_3$ or vinyl. a, b, c and d are the mol fractions of the respective structural units, where a+b+c+d=1. The combination a =0.85 to 0.98, d=0.02 to 0.15 and b=c=0 is preferably chosen.

The polysubstituted chlorine-containing silazane polymers prepared according to the invention are alternatively also called polymeric chlorosilazanes below.

The oligosilazanes used as starting materials can be obtained by reacting excess ammonia with a starting material containing at least one of the two components (II) $R^1R^2SiCl_2$ and (III) $Cl_2R^3Si—CH_2CH_2—SiR^3Cl_2$ and at least one of the two components (IV) $R^4SiCl_3$ and (V) $Cl_3Si—CH_2CH_2—SiR^5Cl_2$, at −70° C. to +100° C., where the radicals independently of one another have the following meanings: $R^1$, $R^2$, $R^4$=H, $C_1$–$C_6$ alkyl or $C_2$–$C_6$ alkenyl and $R^3$, $R^5$=$C_1$–$C_6$ alkyl or $C_2$–$C_6$ alkenyl, and the molar percentage of (II) or (III) or a mixture thereof in the starting material is 30 to 99%, and where the reaction of a mixture containing only (II) and (III) with ammonia shall be excluded.

The chlorosilanes (II) $R^1R^2SiCl_2$ and (IV) $R^4SiCl_3$ used as starting materials for the oligosilazanes are commercially available and the ethylene-bridged species (III) and (V) can be obtained by the hydrosilylation of commercially available $R^3HSiCl_2$ and ethyne or by the hydrosilylation of vinyltrichlorosilane and $R^5HSiCl_2$ (see Experimental report).

The oligosilazanes are preferably prepared by taking the chlorosilanes in a solvent which exhibits inert behavior towards the reactants (chlorosilanes and $NH_3$) and then mixing them with ammonia to the saturation point, which is reached when all the SiCl functional groups have been substituted by NH groups. Examples of solvents which are suitable for this reaction are saturated aliphatic or aromatic hydrocarbons such as n-pentane, cyclohexane or toluene, chlorinated hydrocarbons such as chloroform or chlorobenzene, or ethers such as diethyl ether or THF.

If appropriate, the oligosilazanes can also be prepared under reduced pressure or at pressures of 1 to 100 bar. Ammonia can be metered in as a gas or as a liquid. The process can also be carried out continuously.

In the reaction giving the polymeric chlorosilazane, the molar ratio of the reactants, namely chlorosilane:monomer unit of the oligosilazane (n =1), is preferably about 0.1:1 to about 1.5:1, in particular about 0.1:1 to about 0.7:1.

The reactants are preferably reacted with one another by taking the oligosilazanes and adding at least one of said chlorosilanes thereto. As the reaction is exothermic, the temperature is preferably kept initially at 30° to 50° C. when the reactants are brought together. The reaction mixture is then heated to temperatures of 100° to 300° C., preferably 120° to 250° C.

Some of the $NH_3$ formed as a by-product escapes during the reaction. When the reaction is complete, the remainder of the more readily volatile compounds is removed from the reaction vessel, generally by the application of a vacuum.

Most of the $NH_4Cl$ which is also formed in the reaction sublimes out of the reaction mixture in the course of the reaction. Any residual NH Cl can be separated from the polymeric chlorosilazane prepared according to the invention by extraction with an inert organic solvent such as n-hexane, toluene or ether.

The reaction time depends on the heating rate and the reaction temperature. A reaction time of 3 to 7 hours is generally sufficient.

The reaction can also be carried out in an organic solvent. Suitable solvents are those which exhibit inert behavior towards the reactants and have a sufficiently high boiling point, e.g. saturated aliphatic or aromatic hydrocarbons such as n-decane, decalin, xylene or toluene, chlorinated hydrocarbons such as chlorobenzene, or ethers such as dibenzyl ether or diethylene glycol diethyl ether. When using a solvent in which the $NH_4Cl$ formed is insoluble, the latter can be separated off by filtration. The polymeric chlorosilazanes according to the invention are then obtained by distillation of the solvent under reduced pressure.

If appropriate, the process can also be carried out under reduced pressure or at pressures in the range from 1 to 10 atmospheres.

The process can also be carried out continuously.

The present invention further relates to polysubstituted chlorine-containing silazane polymers which can be obtained by reacting oligosilazanes of formula (I)

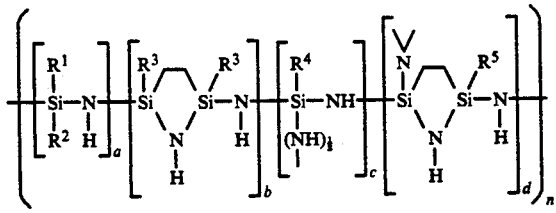

in which at least one of the indices a or b and at least one of the indices c or d are not equal to 0 and n is about 2 to about 12, with at least one of the chlorosilanes $Cl_2R^6Si-CH_2CH_2-SiR^6Cl_2$, $Cl_3Si-CH_2CH_2-SiR^7Cl_2$, $R^8SiCl_3$ or $R^9SiHCl_2$ at 30° C. to 300° C., where the radicals independently of one another have the following meanings: $R^1$, $R^2$, $R^4$=H, $C_1$-$C_6$ alkyl or $C_2$-$C_6$ alkenyl and $R^3$, $R^5$, $R^6$, $R^7$, $R^8$, $R^9$=$C_1$-$C_6$ alkyl or $C_2$-$C_6$ alkenyl.

Preferably, the radicals independently of one another have the following meanings: $R^1$, $R^2$, $R^4$=H, $C_1$-$C_3$ alkyl or $C_2$-$C_3$ alkenyl and $R^3$, $R^5$, $R^6$, $R^7$, $R^8$, $R^9$=$C_1$-$C_3$ alkyl or $C_2$-$C_3$ alkenyl. It is especially preferred if $R^1$=H, $R^2$=$R^3$=$R^5$=$R^6$=$R^7$, =$R^9$=$CH_3$ and $R^4$ and $R^8$ independently of one another are $CH_3$ or vinyl.

The novel polymeric chlorosilazanes can be converted into polysilazanes by reaction with ammonia ("ammonolysis"), and these in turn can be converted by pyrolysis into ceramic material containing silicon nitride.

The ammonolysis can be carried out in liquid $NH_3$, although it is advantageous to carry it out in an organic solvent. Suitable solvents are all those which exhibit inert behavior towards the polymeric chlorosilazanes. Preferred solvents are those in which the ammonium chloride obtained as a by-product has a low solubility and from which it can easily be separated off, e.g. ethers, aliphatic and aromatic hydrocarbons and chlorinated hydrocarbons. In the ammonolysis, the reactants can be fed into the reaction vessel in any order, but it is normally advantageous to take the polymeric chloro silazane in solution and pass in gaseous ammonia or add liquid ammonia. If the polymeric chlorosilazanes according to the invention have been prepared in a suitable organic solvent, the ammonolysis can be carried out in this solvent without prior separation of the $NH_4Cl$. The ammonolysis is preferably carried out with an excess of $NH_3$ in order to ensure that the reaction is complete and the end products are as free from chlorine as possible. Twice the stoichiometric amount is generally sufficient for this purpose.

The reaction is generally carried out at a temperature of about −50° to +100° C., preferably at −20° to +30° C. and in particular at room temperature (in which case ice cooling is used). It is also possible, however, to carry out the reaction above room temperature, e.g. at the boiling point of the solvent used, or below room temperature, e.g. at −33° C. when using liquid $NH_3$.

When the ammonolysis is complete, any excess $NH_3$ is removed and the ammonium chloride obtained is filtered off. The yield can be increased by washing the precipitate with one of the above-mentioned organic solvents. After distillation of the solvent under reduced pressure, the polysilazanes are obtained immediately as white powders. The polysilazanes are soluble in the above organic solvents, so they can be used either to coat surfaces or to manufacture fibers.

The polysilazanes can be pyrolyzed in an inert nitrogen or argon atmosphere, at temperatures of 800° to 1200° C., to form dense, amorphous materials which consist essentially of Si, N and C and can also contain traces of H and O. At pyrolysis temperatures above 1200° C., for instance in the range from 1200° C. to 1400° C., partially amorphous, microcrystalline ceramic materials are formed which contain $\alpha$-$Si_3N_4$ as a crystalline phase.

A particular advantage is that, before pyrolysis, the polysilazanes can be shaped by various processes to form three-dimensional shaped articles.

One important method of shaping is fiber drawing, where fibers can be drawn out of high-viscosity solutions of the polysilazane in solvents such as toluene, THF or hexane. The fibers are advantageously drawn by means of spinnerets with a diameter of 80 to 150 $\mu$m. Subsequent stretching makes the filament thinner, whereby a very strong filament with a diameter of 2 to 20 $\mu$m, in particular 5 to 15 $\mu$m, is formed after pyrolysis. The fibers manufactured by subsequent pyrolysis are used as mechanical reinforcing matrices in fiber-reinforced aluminum, aluminum alloys and ceramic components.

Another important method by which the polysilazanes can be processed is the manufacture of dense, strongly adhesive, amorphous or microcrystalline ceramic coatings on metals, in particular steel. The coatings are applied with the aid of a solution of the polysilazane in organic solvents such as toluene, THF or hexane. Pyrolytic conversion into an amorphous or crystalline layer takes place in the same temperature range of 800° to 1200° C. or 1200° to 1400° C., under an inert gas, in the manner described above for three-dimensional shaped articles.

On account of their outstanding adhesion, high hardness and surface quality, the ceramic coatings are particularly suitable for improving the surface of mechanically and chemically stressed machine components.

The polysilazanes described above can also be pyrolyzed in an $NH_3$ atmosphere rather than in an inert gas, with an equally high ceramic yield of 70 to 90%. This results in a practically carbon-free, transparent, colorless material. When pyrolysis is carried out in $NH_3$ at 1000° C. or above, the carbon content is less than 0.5% by weight. Depending on the pyrolysis temperature, the pyrolysis product consists of practically pure, amorphous silicon nitride (pyrolysis below 1200° C.) or crystalline $Si_3N_4$ (pyrolysis above 1200° C., in particular above 1300° C). Pyrolysis in $NH_3$ can be applied to all the shaped articles manufactured by the shaping processes described above, i.e. articles shaped from powders, fibers and coatings.

Thus the invention further relates to a process for the manufacture of ceramic material containing silicon nitride, wherein the above-mentioned polymeric chlorosilazanes, characterized by the process for their preparation, are reacted with ammonia at −50° to +100° C. and the polysilazane formed is pyrolyzed in an inert nitrogen or argon atmosphere or in an ammonia atmosphere at 800° to 1400° C.

Preferably, however, the conversion of the polymeric chlorosilazanes into ceramic material containing silicon nitride is carried out in such a way that the polysilazanes formed as intermediates are not isolated. In this case, the polymeric chlorosilazanes are preferably reacted with gaseous ammonia and the reaction mixture formed is pyrolyzed in an ammonia atmosphere.

Accordingly, the present invention further relates to a process for the manufacture of ceramic material containing silicon nitride, wherein the above-mentioned polymeric chlorosilazanes, characterized by the process for their preparation, are reacted with ammonia at 0° to +300° C. and the reaction product is pyrolyzed in an $NH_3$ atmosphere at 800°-1400° C.

EXAMPLE 1

Preparation of a polymer by reaction of an oligomer of formula (I) (a=0.42, b=0.20, c=0.38, d=0; $R^1$=H, $R^2=R^3=R^4=CH_3$) with $CH_3SiCl_3$ a) Preparation of the oligomer In a 2 l four-necked round-bottomed flask fitted with a stirrer, a condenser and a gas feed, 50 ml (55.7 g, 0.48 mol) of $CH_3SiHCl_2$, 50 ml (60 g, 0.23 mol) of $Cl_2CH_3Si-CH_2CH_2-SiCH_3Cl_2$ and 50 ml (63.6 g, 0.43 mol) of $CH_3SiCl_3$ were dissolved in 1.5 l of absolute THF and the solution was mixed. Ammonia was then passed in to the saturation point at temperatures of between 0° C. and 10° C. When the reaction was complete, the mixture was allowed to thaw and the ammonium chloride formed was separated off.

The filtrate was freed from THF and the other volatile constituents under a reduced pressure of up to ca. 10 mbar and at ca. 40° C. The solvent-free oligosilazane remained as a clear, readily mobile oil (74.5 g).

b) Preparation of the polymer

The oligosilazane was dissolved in 150 ml of toluene, and 45.3 ml (57.6 g, 0.38 mol) of $CH_3SiCl_3$ were added carefully, the internal temperature rising to 48° C. The reaction mixture was then refluxed for 2 hours to form a colorless precipitate. The solvent was then distilled under reduced pressure into a cold trap at −78° C., the temperature of the oil bath being raised by 10° C. every 15 minutes and the pressure inside the flask being lowered somewhat so that a pressure of 0.1 mbar was finally reached at 220° C.

During this process, part of the reaction mixture sublimed on to the colder parts of the vessel, leaving a clear melt. On cooling, this became more viscous and ultimately solid; at 20° C., the resulting substance was transparently brittle and clearly translucent.

Yield: 75.3 g.

Analytical data: Si 35.6 %, N 13.4 %, Cl 16.3 %, O<0.3 %.

EXAMPLE 2

Preparation of a polymer by reaction of an oligomer of formula (I) (a=b=c=d=0.25; $R^1=R^2=R^3=R^4=R^5=CH_3$) with $Cl_3Si-CH_2CH_2-SiCH_3Cl_2$ The procedure was analogous to that in Example 1.

a) Preparation of the oligomer

Chlorosilanes used:

33.9 g (31.9 ml, 0.26 mol) of $(CH_3)_2SiCl_2$ 67.4 g (56.2 ml, 0.26 mol) of $Cl_2CH_3Si-CH_2C-H_2-SiCH_3Cl_2$ 39.3 g (30.9 ml, 0.26 mol) of $CH_3SiCl_3$ 72.8 g (60.6 ml, 0.26 mol) of $Cl_3Si-CH_2C-H_2-SiCH_3Cl_2$ Yield: 85 g.

b) Preparation of the polymer 85 g of oligomer were reacted with 80.6 ml (96.8 g, 0.35 mol) of $Cl_3Si-CH_2CH_2-SiCH_3Cl_2$.

Yield: 88.2 g.

Analytical data: Si 34.2 %, N 14.1 %, Cl 18.2 %, O<0.3%.

EXAMPLE 3

Preparation of a polymer by reaction of an oligomer of formula (I) (a=0.64, b=0.16, c=0.2, d=0; $R^1$=H, $R^2=R^3=CH_3$, $R^4$=vinyl) with $Cl_3Si-CH_2C-H_2-SiCH_3Cl_2$ The procedure was analogous to that in Example 1.

a) Preparation of the oligomer

Chlorosilanes used:

100.3 g (90 ml, 0.78 mol) of $CH_3SiHCl_2$ 48.0 g (40 ml, 0.19 mol) of $Cl_2CH_3Si-CH_2C-H_2-SiCH_3Cl_2$ 38.1 g (30 ml, 0.24 mol) of vinyl-$SiCl_3$ Yield: 92 g.

b) Preparation of the polymer 92 g of oligomer were reacted with 132.7 g (110.6 ml, 0.48 mol) of $Cl_3Si-CH_2CH_2-SiCH_3Cl_2$.

Yield: 152.4 g.

Analytical data: Si 32.1 %, N 15.2 %, Cl 15.8 %, O<0.3 %.

What is claimed is:

1. A process for the preparation of polysubstituted chlorine-containing silazane polymers which comprises reacting oligosilazanes of formula (I)

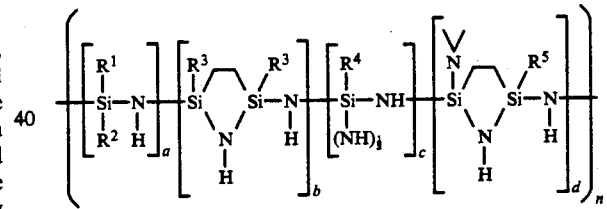

in which at least one of the indices a or b and at least one of the indices c or d are not equal to 0 and n is about 2 to about 12, with at least one of the chlorosilanes $Cl_2R^6Si-CH_2CH_2-SiR^6Cl_2$, $Cl_3Si-CH_2C-H_2-SiR^7Cl_2$, $R^8SiCl_3$ or $R^9SiHCl_2$ at 30° C. to 300° C., where the radicals independently of one another have the following meanings: $R^1$, $R^2$, $R^4$=H, $C_1-C_6$ alkyl or $C_2-C_6$ alkenyl and $R^3, Rj^5$, $R^6, R^7$, $R^8, R^9=C_1-C_6$ alkyl or $C_2-C_6$ alkenyl.

2. A process for the preparation of polysubstituted chlorine-containing silazane polymers, wherein oligosilazanes which have been obtained by reacting a starting material containing at least one of the two components (II) $R^1R^2SiCl_2$ and (III) $Cl_2R^3Si-CH_2C-H_2-SiR^3Cl_2$ and at least one of the two components (IV) $R^4SiCl_2$ and (V) $Cl_3Si-CH_2CH_2-SiR^5Cl_2$, with excess ammonia at 30° to 300° C., are reacted with at least one of the chlorosilanes $Cl_2R^6Si-CH_2CH_2-SiR^6Cl_2$, $Cl_3Si-CH_2CH_2-SiR^7Cl_2$, $R^8SiCl_3$ or $R^9SiHCl_2$ at 30° to 300° C., where the radicals independently of one another have the following meanings: $R^1$, $R^2$, $R^4$=H, $C_1-C_6$ alkyl or $C_2-C_6$ alkenyl and $R^3$, $R^5$, $R^6$, $R^7$, $R^8$, $R^9=C_1-C_6$ alkyl or $C_2-C_6$ alkenyl.

3. A process as claimed in claim 1 or 2, wherein the radicals independently of one another have the following meanings:

$R^3, R^5, R^6, R^7, R^8, R^9 = C_1-C_3$ alkyl or $C_2-C_3$ alkenyl.

4. A process as claimed in claim 1 or 2, wherein $R^1 = H$, $R^2 = R^3 = R^5 = R^6 = R^7 = R^9 = CH_3$ and $R^4$ and $R^8$ independently of one another are $CH_3$ or vinyl.

5. A polysubstituted chlorine-containing silazane polymer which can be obtained by the process as claimed in claim 1 or 2.

* * * * *